United States Patent [19]

Ziemianek

[11] Patent Number: 4,955,323

[45] Date of Patent: Sep. 11, 1990

[54] FIRED HEATER

[75] Inventor: Janusz B. Ziemianek, Washington Crossing, Pa.

[73] Assignee: Foster Wheeler USA Corporation, Clinton, N.J.

[21] Appl. No.: 307,021

[22] Filed: Feb. 6, 1989

Related U.S. Application Data

[62] Division of Ser. No. 71,825, Jul. 10, 1987, abandoned.

[51] Int. Cl.⁵ .................................................. F22B 1/02
[52] U.S. Cl. ................................... 122/4 D; 122/360; 432/222
[58] Field of Search .......... 122/4 D, 1 B, 1 C, 235 D; 126/92 C; 432/222

[56] References Cited

U.S. PATENT DOCUMENTS

| | | |
|---|---|---|
| 2,699,759 | 1/1955 | Kuhner ................................ 122/1 C |
| 2,840,043 | 6/1958 | Durham .............................. 122/4 D |
| 2,856,905 | 10/1958 | Bowen, III ......................... 122/4 D |
| 3,230,052 | 1/1966 | Lee et al. . |
| 3,259,112 | 7/1966 | Lee . |
| 3,264,068 | 8/1966 | Ghetto et al. . |
| 3,265,043 | 8/1966 | Lee et al. ............................. 122/360 |
| 3,396,782 | 8/1968 | Valyi .................................. 122/4 D |
| 3,439,653 | 4/1969 | Lee et al. . |
| 3,614,073 | 10/1971 | Born . |
| 3,656,913 | 4/1972 | Blaha et al. . |
| 3,884,193 | 5/1975 | Bryers ................................ 122/4 D |
| 3,893,426 | 7/1975 | Bryers ................................ 122/4 D |
| 4,089,303 | 5/1978 | Brulfert ............................. 122/4 D |
| 4,444,154 | 4/1984 | Weber ................................ 122/4 D |
| 4,455,968 | 6/1984 | Northcote ......................... 122/4 D |

Primary Examiner—Henry C. Yuen
Attorney, Agent, or Firm—Marvin A. Naigur

[57] ABSTRACT

A fired heater in which at least a portion of a tube extends within an enclosure and receives fluid from a manifold disposed externally of the enclosure via a conduit. At least a portion of the conduit extends within the enclosure so that, when heat is applied to the enclosure for heating the fluid the fluid in the conduit is preheated.

3 Claims, 2 Drawing Sheets

FIRED HEATER

This is a divisional of co-pending application Ser. No. 0/071,825 filed on July 10, 1987, abandoned.

BACKGROUND OF THE INVENTION

This invention relates to a fired heater, having catalyst filled tubes and more particularly, to a flexible connector between catalyst tubes and the inlet header.

Fired heaters are often utilized to obtain an endothermic reaction in fluid which is passed through one or more catalyst filled tubes disposed within the radiant section of the heater. For example, the fired heater can be utilized as a steam-hydrocarbon reformer in which the tubes contain a catalytic material. Fluid, in the form of a mixture of steam and hydrocarbon, flows from a header, or manifold, located externally of the furnace to the tubes via a conduit connecting the header to each tube. Heat is produced in the furnace at a level sufficient to produce hydrogen and carbon monoxide in the tubes, for example.

In prior art arrangements, the mixture of steam and hydrocarbon is normally preheated before it is introduced into a distribution header, which, in turn, feeds the tubes.

SUMMARY OF THE INVENTION

It is an object of this invention to provide a fired heater which eliminates the need for preheating the fluid before it is introduced to the header supplying the catalyst tubes.

It is a further object of present invention to provide a fired heater of the above type in which the fluid is preheated as it flows through a connector from the header located externally of the furnace to the catalyst filled tubes located in the furnace.

Toward the fulfillment of these and other objects the fired heater of the present invention includes a plurality of tubes extending within an enclosure and connected to a manifold disposed externally of the enclosure by a conduit. At least a portion of the conduit extends within the enclosure so that, when heat is applied to the enclosure, that portion of the fluid flowing through the conduit located within the enclosure is preheated

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENTS

Figure 1:
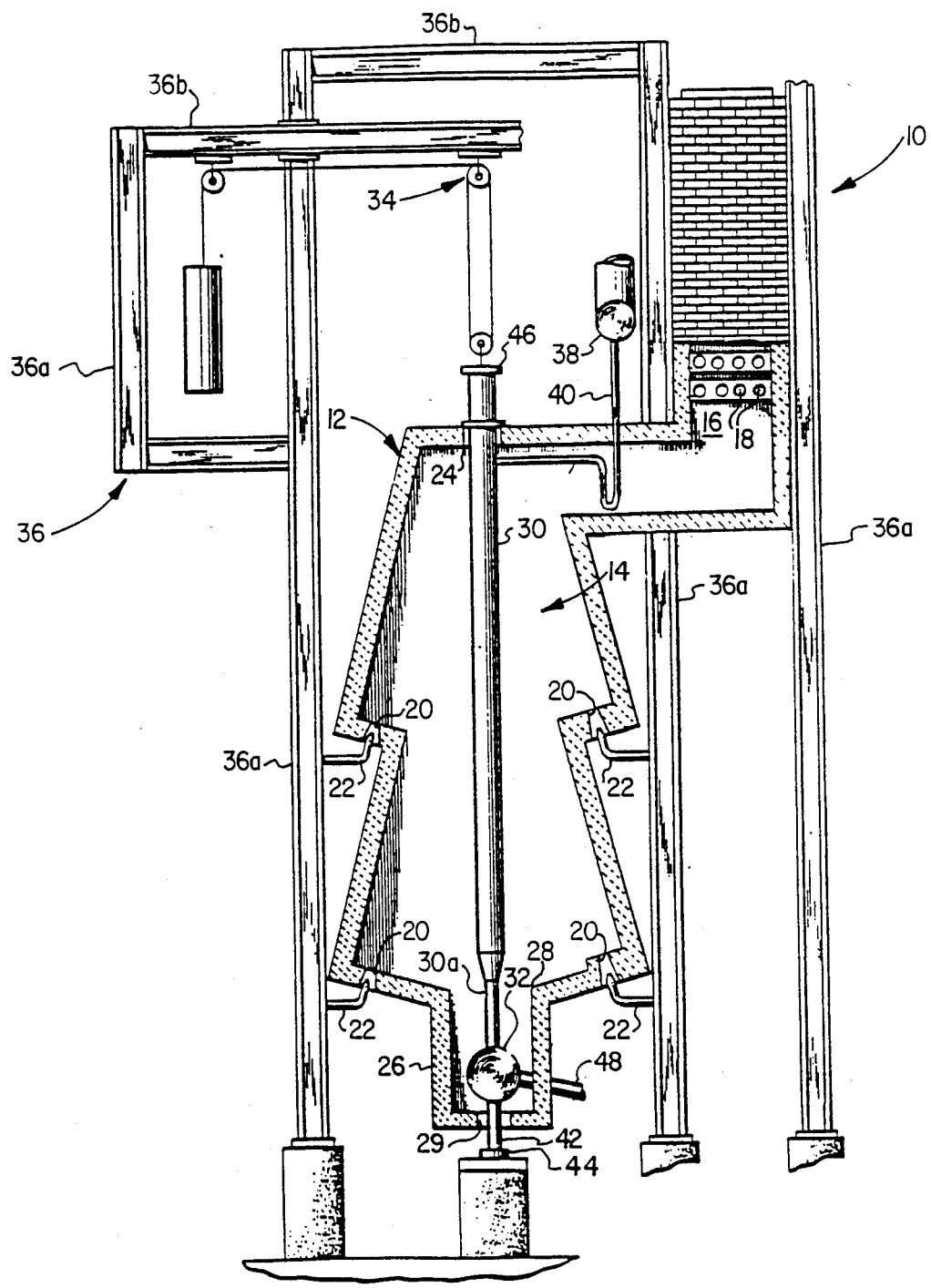
FIG. 1 is a partial elevational view depicting the fired heater of the present invention.

Referring to the embodiment of FIG. 1 of the drawings, the reference numeral 10 refers in general to the fired heater of the present invention which includes an enclosure, or firebox, 12 forming a furnace chamber 14 The walls of the enclosure 12 may be stepped, or terraced, as shown and are formed of multi-layers of insulating and structural material.

Extending upwardly from the chamber 14 is a convection compartment 16 in which a plurality of convection tubes 18 are located. A plurality of ports 20 are provided in the stepped portions of the walls forming the enclosure 12, through which burners 22 are inserted to provide flame and hot gases within the chamber 14. The gases pass upwardly through the chamber 14 and the convection compartment 16 and across the tubes 18 before discharging to atmosphere.

An opening 24 is formed in the upper wall of the enclosure 12 and extends along a vertical center line of the chamber 14. An extension 26 is formed in the lower portion of the enclosure 12 and extends directly beneath an opening 28 formed in the lower wall of the enclosure 12. An opening 29 is formed in the lower wall of the extension 26.

A row of tubes 30 extend through the enclosure 12 and are vertically oriented in a common plane. The tubes 30 extend through the openings 24 and 28 with their upper end portions extending above the upper wall of the enclosure 12 and their lower end portions extending into the chamber defined by the extension 26. The upper ends of the tubes 30 are secured to a winch, or weight and pulley, system, shown in general by the reference numeral 34. The winch system 34 is secured to a structural frame assembly 36 including vertical beams 36a and horizontal beams 36b which function to support the entire unit, including the enclosure 12 and the convection compartment 16.

Fluid is supplied to the tubes 30 from an upper header, or manifold, 38 extending above the upper wall of the enclosure 12, through a plurality of semi-flexible, pig-tail conduits 40. Although not clear from the drawing, a plurality of the conduits 40 extend from the header 38, and each conduit is connected to the upper end portion of a corresponding tube 30.

In the event the fired heater 10 is to function as a steam-hydrocarbon reformer, the fluid introduced to the tubes 30 from the manifold 38 is a mixture of steam and a hydrocarbon. A solid catalytic material is provided in each tube 30 so that a reaction takes place in each tube when the burners 22 raise the temperature within the chamber 14 to a predetermined level, all in a conventional manner. The conduits 40 are sufficiently flexible to accommodate the thermal expansion of the header 38, while the thermal expansion of the tubes 30 along their longitudinal axes is compensated for by the upward movement permitted by the winch system 34. Although not shown in the drawings, it is understood that the header 38 is supported by a conventional flexible support system (not shown) which also compensates for thermal expansion of the tubes 30.

The lower end portion 30a of each tube 30 is reduced in diameter and a portion thereof extends through and into the header 32. Although not shown in the drawing it is understood that a plurality of perforations can be provided in the lower end portion 30a of each tube 30 that extends within the header 32, to permit the fluid within the tube to flow outwardly into the header while still retaining the catalyst with the tube.

A plurality of extension members 42, of approximately the same diameter as the lower end portions 30a of the tubes 30 project from the header 32. Although not shown in the drawings, it is understood that the upper end of each extension member 42 is located in registry with the end portion 30a of a corresponding tube 30 in the interior of the header 32, and preferably slightly spaced apart therefrom to accommodate thermal expansion The projecting portions of the extension members 42 extend through the opening 29 formed in the lower wall of the extension 26.

The lower end of each extension member 42 is closed by a plurality of caps 44 which function in a conventional manner to permit removal of the catalyst and to retain the catalyst within the tube during operation. A plurality of caps 46 are provided at the upper ends of the tubes 30 to permit insertion of the catalyst into the tubes.

An outlet tube 48 is connected to the lower header 32 approximately at the center thereof to permit the reacted elements to discharge from the header.

It is thus seen that, by virtue of a portion of each conduit 40 extending within the enclosure, the fluid, while passing from the header 38 through the conduit and to its corresponding tube 30, is preheated, thus eliminating the need for a separate preheating step and structure. This, of course, considerably reduces the costs of the system.

Figure 2:
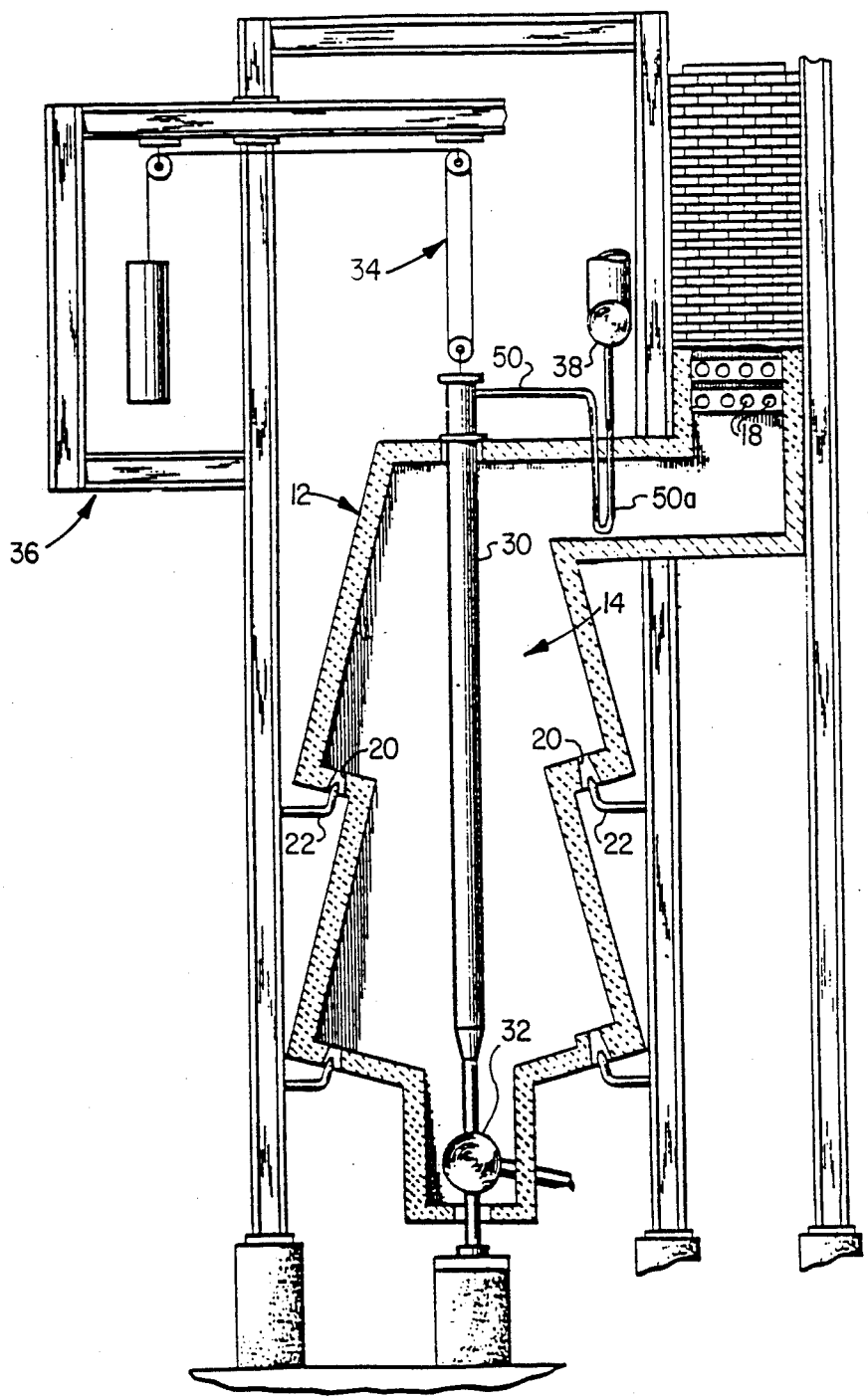
FIG. 2 is a view similar to FIG. 1 but depicting an alternate embodiment of the fired heater of the present invention.

The embodiment of FIG. 2 is similar to that of FIG. 1 and identical components will be given the same reference numeral. In this embodiment, a plurality of semi-flexible conduits 50 are provided which connect the manifold 38 to the tubes 30. One end of each conduit is connected to the header 38 externally of the enclosure 12 and the other end is connected to the projecting portion of its corresponding tube 30 that extends above the upper wall of the enclosure 12. A portion of each conduit 50, shown by the reference numeral 50a, extends within the enclosure so that the fluid passing from the header 38 to the tube 30 is preheated by the heat in the chamber 14 for the same reasons as in the previous embodiment It is understood that several variations may be made in the foregoing without departing from the scope of the invention. For example, the invention is not limited to the particular configuration and arrangement of the various ancillary components, such as the enclosure, the burners, the supporting structure, etc. as long as the connection between the tubes 30 and the header 38 is made in the manner discussed above.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A fired heater comprising an enclosure defining a chamber, at least one catalyst-filled tube having a first portion extending in said chamber and a second portion extending externally of said enclosure, means disposed externally of said enclosure for receiving fluid, a conduit having a first end portion connected to said means for receiving fluid, a second end portion connected to said second portion of said tube, and an intermediate portion extending in said chamber, and means for applying heat to said chamber for preheating the fluid in said intermediate portion of said conduit and heating said fluid in said first tube portion.

2. The fired heater of claim 1 wherein said means for receiving fluid extends above said enclosure.

3. The fired heater of claim 1 wherein said means for receiving fluid is a heater or manifold.

* * * * *